United States Patent

Kroos

[15] 3,649,844

[45] Mar. 14, 1972

[54] PARITY CIRCUIT IN ECL TECHNIQUE WITH SHORT TRANSIT TIME

[72] Inventor: Friedrich-Karl Kroos, Soecking, Germany

[73] Assignee: Siemens Aktiengesellschaft, Berlin and Munich, Germany

[22] Filed: June 1, 1970

[21] Appl. No.: 41,901

[30] Foreign Application Priority Data

June 9, 1969 Germany ....................... P 19 29 144.2

[52] U.S. Cl. ............................. 307/216, 235/176, 307/207, 307/218

[51] Int. Cl. .................................... G06f 11/10, H03k 19/32

[58] Field of Search .................. 307/203, 207, 211, 213, 214, 307/215, 217, 218, 216; 328/92, 93, 94, 159; 235/176

[56] References Cited

UNITED STATES PATENTS

| | | | |
|---|---|---|---|
| 3,519,810 | 7/1970 | Priel et al. | 235/176 |
| 3,040,192 | 6/1962 | Slobodzinski | 307/216 X |
| 3,508,076 | 4/1970 | Winder | 307/213 X |

OTHER PUBLICATIONS

Gersbach, " Four-Way Exclusive-Or," IBM Technical Disclosure Bulletin, p. 1162, Vol. 11, No. 9, 2- 1969.
Cavaliere, " Nonlinear Resistor for Collector Clamping," IBM Technical Disclosure Bulletin, pp. 328- 329, Vol. 9, No. 3, 8/1966.
Hurley, Transistor Logic Circuits, p. 210, John Wiley & Sons, Inc., 1961.
Millman & Taub, Pulse, Digital and Switching Waveforms, p. 257, McGraw-Hill Book Company, 1965.
Flynn, " CTRL Adder," IBM Technical Disclosure Bulletin, p. 21, Vol. 1, No. 6, 4- 1959.

*Primary Examiner*—Donald D. Forrer
*Assistant Examiner*—L. N. Anagnos
*Attorney*—Hill, Sherman, Meroni, Gross & Simpson

[57] ABSTRACT

A three-input parity circuit constructed in accordance with ECL techniques employs four current switches each having s pair of transistors, and wherein a pair of collector load resistors are shared by three of the switches and shared via one of those three switches by the fourth current switch to obtain, in response to three input signals, formation of the logical function (or its inverse) of *P=a·b·c+a·b·c+a·b·c+a·b·c*.

7 Claims, 2 Drawing Figures

PATENTED MAR 14 1972

3,649,844

INVENTOR
Friedrich-Karl Kroos

BY Hill, Sherman, Meroni, Gross & Simpson
ATTYS.

PARITY CIRCUIT IN ECL TECHNIQUE WITH SHORT TRANSIT TIME

BACKGROUND OF THE INVENTION

1. Field of the Invention

This invention relates to apparatus for the securing of data against unperceived transmission errors.

2. Description of the Prior Art

The simplest safeguarding technique is accomplished through the utilization of a so-called parity bit, which parity bit completes the number of ones in a binary-coded data word, for example, to an odd number. At the receiving station, through the use of a corresponding circuit arrangement hereinafter designated as a parity circuit, a check is made as to whether this condition is still maintained.

There must be required of such a parity circuit as short as possible a signal transit time especially when the safeguarded data transmission is processed at the desired, ever higher processing speeds. For the integrated structure of the switching circuits there are provided furthermore, also the requirements for easy integratability, as few as possible connecting terminals and low current absorption of the individual unit blocks.

More particularly the data words used in data processing installations inclusive of the parity bit generally contain many bits, the generation of the parity signal is carried out in several stages. The necessary circuit is generally composed of partial circuits for two or three bits. Frequently these partial circuits require the input information both in normal and in inverted form. In consequence of the cascade circuit, therefore, the input information has to be available in normal and inverted form. If value is placed on the realization of as short as possible a transit time, the inverting is carried out, not through an inverter stage engaged on output side, but there is generated in a first group of partial circuits the parity signal P and simultaneously in a second group the inverse signal to this, $\overline{P}$. Such parity circuits with partial circuits for two or three bits are known through German published application 1,193,608. The partial circuits consist of three or four NEITHER-NOR gates with two or three inputs. The gate outputs are connected with one another.

There is then provided through the utilization of three-bit partial circuits a shorter total transit time than with two-bit partial circuits and a lower overall cost. Because of the doubling of the partial circuits for the generation of the parity signals in normal and inverted form, however, the cost is in any case considerable. For an execution in integrated technique, the terminal requirement is also highly disadvantageous.

More favorable arrangements with respect to cost and required number of terminals are obtained if the partial circuit gets along without input signals and thereby also without inverse output signals. An example of this is the construction of two-bit partial circuits of antivalence gates, i.e., (EXCLUSIVE OR). What is disadvantageous in such arrangements is the generally higher number of stages required.

It is the primary object of the invention to provide a parity circuit (partial circuit) which, as already partially indicated, can process three bits simultaneously, which circuit requires input signals only in one form, either normal or inverted, a short running time, if possible corresponding only to one gate transit time, and has a low current consumption. The parity circuit should, further be constructed in accordance with the so-called ECL switching circuit technique.

SUMMARY OF THE INVENTION

According to the invention, this problem is solved by the means that three current switches are provided, in each case, with two emitter-coupled transistors, that on the base in each case of a transistor of each current switch there is provided an input signal and the base of the other transistor in each case is provided with a fixed potential. The collectors of a transistor in each case of all three current switches are connected into a first and a second coupling point, and the coupling points are connected in each case over the parallel circuit of a diode engaged in its pass direction and of a resistor with the reference potential and one of the bases of two further transistors, whose collectors are connected with the reference potential and whose emitters are connected with a common output terminal and over a common resistance with the negative pole of the operating voltage source. The first current switch is provided in the collector circuit of the transistor acted on with an input signal and the second current switch is provided in the collector circuit of the transistor fixed on its base of a fourth current switch. The emitter of the transistor of the third and fourth current switch in each case are connected to sources of approximately constant current.

BRIEF DESCRIPTION OF THE DRAWING

Other objects, features and advantages of the invention, its organization, construction and operation will be best understood from the following detailed description taken in conjunction with the accompanying drawing, on which.

DESCRIPTION OF THE PREFERRED EMBODIMENT

The basic circuit of the ECL switching circuit technique is a differential amplifier with two NPN transistors connected to its emitter. The emitters are connected over a current impression to the negative pole of the operating voltage source. The collector resistances allocated individually to each of the two transistors are connected to the positive pole, which in general forms the reference potential. The base of the one of the two transistors is connected to a fixed potential. The binary control signal on the base of the other transistor is chosen in such a way that in the one state (logical "1") it is a slightly more positive and in the other state (logical "0") it is slightly more negative than the fixed potential. The transistor on the base of which the more positive potential appears is in each case conducting, while the other is blocked.

On the collector of the transistor controlled on its base there arises the inverted input signal, while on the collector of the other transistor there is available the input signal in its normal form. Since the current impressed by the current source in the emitter circuit between the two transistors is switched over through the input voltage on the base of the one transistor, one may also speak of a voltage-controlled current switch. The constant current source is frequently replaced by a simple resistor, the value of which is considerably greater than the value of the collector resistors.

The next development stage of the ECL switching circuits is known by the designation "series gating" (cf. "The Electronic Engineer," Nov. 1967, pages 56 to 60). Here, the collector resistors of the fundamental circuit are replaced by two further current switches of the type described. If one applies to the control inputs of the newly added current switches of the "upper logical plane" in common a signal *a* and on the control input of the "lower logical plane" a signal *b*, then corresponding to the four outputs of the upper logical plane, there can be realized four different logical functions. Other logical linkings of the signals *a* and *b*, namely the functions of equivalence and antivalence are provided in a manner known per se by the means that in each case the collectors of the transistors driven on the base and that fixed to the base of different current switches of the upper logical plane are connected with one another (cf. Data Sheet MC 1019, MC 1219 of the Motorola Semiconductor Products, Inc., edition of Nov. 1967).

Figure 1:
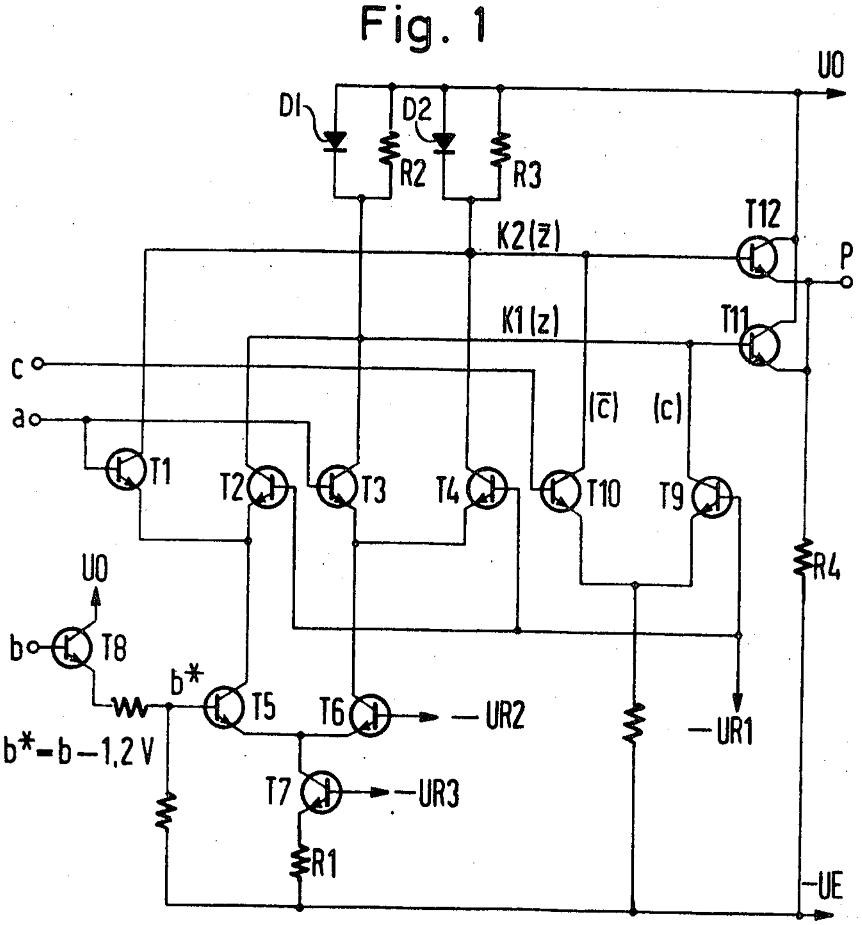
FIG. 1 is a schematic diagram of an embodiment of the invention.

Of the circuit principles described, use is made also in the parity circuit according to the invention, as illustrated in the left-hand part of FIG. 1. The current switches of the upper logical plane are formed by the transistors T1 and T2, respectively, T3 and T4. The control inputs on the transistors T1 and T3 are connected together and are driven over the input terminals *a* by the signal *a* of the same name. The base connections of the other two transistors T2 and T4 are connected in common to a fixed potential-UR1, which has with respect to the reference potential UO, for example, a voltage of about 1.2v.

The current switch with the transistors T1, T2 and T3, T4, respectively, are connected into the collector circuits of further transistors T5 and T6, respectively. These transistors again form a current switch of the type described; i.e., their emitters are connected with one another and connected over an arrangement consisting of the transistor T7 with its fixed base connected to the potential –UR3 and the resistor R1, for the generation of a constant current, to the negative pole –UE of the operating voltage source. The base of the transistor T6 is connected to the fixed potential –UR2 (for example, 2.4 v. with respect to the reference potential). To the base of the transistor T5 there is connected an emitter follower on the input side with the transistor T8, which shifts the control voltage b* (b*≈b –1.2 volts) for the transistor T5 by a suitable amount with respect to the input signal *b* on the terminal *b* in potential. For the potential shift of the input signal *b*, other circuit arrangements may be employed.

The collectors of the transistors T1 and T4, respectively T2 and T3, are in each case connected with one another and connected by way of the resistors R3, R2, respectively to the reference potential. The connecting points (coupling points) are designated with K1 and K2. The diodes D1, D2 connected in parallel to the resistors R2, R3 prevent the occurrence of a higher voltage drop about 0.7 volts across the resistors.

If there is examined first of all only the logical function which is realized through the circuit part, so far described and represented in the left-hand part of FIG. 1, at the gating (coupling) points, then there are provided the logical relationships $$z=a\cdot b+\bar{a}\cdot\bar{b} \text{ and } \bar{z}=a\cdot\bar{b}+\bar{a}\cdot b.$$

In actual fact, as FIG. 1 shows, the gating point K1 is connected with the collector of a transistor T9 and the base of a transistor T11 and the gating point K2 with the collector of a transistor T10 and the base of a transistor T12. The transistors T9 and T10 form, in turn, an emitter-coupled current switch which is controlled with the input signal *c* at the input *c*. Through the extended collector coupling (gating) there now arise the partial signals $$c\cdot(a\cdot b+\bar{a}\cdot\bar{b}) \text{ and } \bar{c}\cdot(a\cdot\bar{b}+\bar{a}\cdot b).$$

Both partial signals are then comprehended in the output emitter followers with the transistors T11 and T12 and the common operating resistor R4 by a so-called wired OR onto the output terminal P, so that with like designation of the output signal the logical function formed reads as follows:

$$P=a\cdot b\cdot c+\bar{a}\cdot b\cdot\bar{c}+a\cdot\bar{b}\cdot\bar{c}+\bar{a}\cdot\bar{b}\cdot c$$

*P*, therefore, is always equal to "1," when the number of ones on the three inputs *a*, *b* and *c* is odd (P circuit).

The circuit arrangement requires only one stage transit time. Because of the series and collector coupling (gating), this transit time is, to be sure, somewhat greater than over a standard NOR-OR gate of the ECL technique. If there is assumed for the standard gate a transit time of barely four ns, then there is provided for the three-bit partial circuit according to the invention a transit time of about four nonoseconds. As compared to a circuit arrangement of NOR gates, the proposed circuit arrangement, with otherwise comparable dimensioning, is only about half as great. In consequence of the restriction of the series coupling to two-stage arrangements there can be allowed considerably greater tolerances with respect to the input signals and the fixed base potentials than would be the case in three-or more-staged systems.

Figure 2:
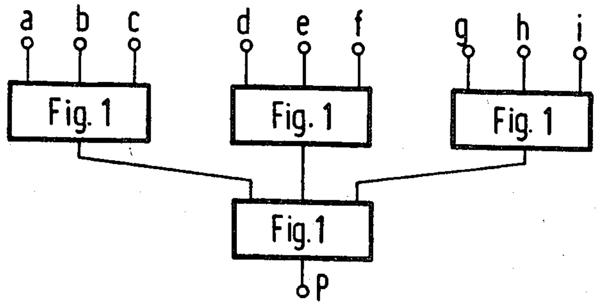
FIG. 2 is a block diagram of a combination of a plurality of the circuits of FIG. 1.

For the practical execution it is proposed that there be constructed an integrated block for the parity control over nine bits, which according to FIG. 2 consist of four-three-bit partial circuits according to FIG. 1. The voltage divider (not represented in FIG. 1) for the generating of the fixed base potentials is to be provided only once in the nine-bit block. The block then has 10 logic terminals and two terminals for the current supply; it can be accommodated therefore, for example, in the known "dual-in-line casing" with 14 connecting terminals.

With the nine-bit blocks there can be constructed more extensive circuit systems for the parity control. Unneeded input terminals are then to be connected to a fixed potential which corresponds to the logical "0."

In case a check is to be made not over odd numbers, but for even numbers of the ones, it is only necessary to choose the reversed allocation between *z* with respect to $\bar{z}$ and *c* with respect to $\bar{c}$ by interchanging the transistors T9, T10 connected to the gating points, of the current switch controlled by the input signal *c*. There is then obtained the logical expression $$Q=c\cdot\bar{z}+\bar{c}\cdot z=\bar{a}\cdot\bar{b}\cdot\bar{c}+\bar{a}\cdot b\cdot c+a\cdot\bar{b}\cdot c+a\cdot b\cdot\bar{c}.$$

*Q*, therefore, always becomes "1" when the number of ones on the inputs *a*, *b* and *c* is even. (Q circuit.)

Instead of changing the allocations of transistors to the gating points K1 and K2 it is more expedient to connect the bases of the transistors T5, T6 or T9, T10 and the corresponding fixed potential to connecting terminals and to establish the required connection of the base of one of the two transistors of the selected current switch with the fixed potential by means of an external bridge. A further possibility exists in the leadingout in common of the base connections of the transistors T1, T3 and T2, T4, respectively. Through the choice of the bridges or of the transistor driven through the corresponding input signal it is possible, without internal intervention in the circuit structure, to form at will the *P* or the *Q* function.

The simple type of conversion of a P circuit into a Q circuit proves highly expedient also in the comprehending of four, three-bit partial circuits into an integrated block. A more detailed investigation of the conditions in the parity testing with a cascade circuit similar to that illustrated in FIG. 2 of three-bit partial circuits which is not to be discussed further here provides as a general rule, the following: If in a group of originally four P circuits an odd number of them (1 or 3) is replaced by Q circuits, then there is provided at the output a parity signal with an even number of ones in the checked data word (Q signal). Correspondingly, there arises a parity signal with an odd number of ones on the inputs (P signal) if within a group of four no P circuit two P circuits or all four P circuits are replaced by Q circuits.

From the abundance of combinational possibilities which may be provided from the foregoing for the construction of an integrated block with three-bit partial circuits, for practical execution, because of the smallest number of additional connecting terminals, all the cases are interesting in which the block unit consists of three-irreversible partial circuits of a certain type and of a reversible partial circuit. Such a block can easily be adapted to the particular requirements. If, for example, the three partial circuits controlled directly by the input signals are executed as irreversible P circuits, then the fourth partial circuit for the processing of the intermediate results in the checking for odd numbers is likewise to be operated as a P circuit, and in the checking for even numbers as a Q circuit.

Equivalent to this is the replacement of all the P circuits by Q circuits and vice versa.

It is readily perceived that the input signals can be offered, instead of in their normal form, also in the inverted form. There is no change in the result if an even number of input signals is replaced by the inverted signals. With replacement of an odd number of input signals the test results are interchanged.

For the sake of completeness it should further be pointed out that the three-bit partial circuit according to FIG. 1 also fulfills the function of the summing output of a full-adder.

While I have described my invention with reference to a specific illustrative embodiment, many changes and modifications may become apparent to those skilled in the art without departing from the spirit and scope of the invention, and it is to be understood that I wish to include within the patent warranted hereon all such changes and modifications as may reasonably and properly be included within the scope of my contribution to the art.

What I claim as my invention is:

1. A parity circuit constructed in ECL technique and having a short transit time, comprising: three current switches each of which includes first and second transistors, each of said transistors having a base, an emitter and a collector and the transistors of each said switch being emitter coupled, said bases of each said first transistor adapted to receive respective input signals and said bases of each of said second transistors adapted for connection to a fixed potential, said collectors divided into two groups and the collectors so associated connected together to form first and second gating points; a first diode connected to said first gating point and adapted for connection to a reference potential and poled in its pass direction, and a first resistor connected in parallel with said first diode, a second diode connected to said second gating point and adapted for connection to the reference potential and poled in its pass direction, and a second resistor connected in parallel with said second diode; a fourth current switch adapted to receive an input signal and including first and second current paths, said emitters of said first current switch connected to said first current path of said fourth current switch, and said emitters of said second current switch connected to said second current path of said fourth current switch; means for providing constant currents connected to said emitters of said third current switch and to said first and second current paths of said fourth current switch; and means connected to said first and second gating points for deriving an output signal.

2. A parity circuit as set forth in claim 1, for the formation of the logical function $$P = a \cdot b \cdot c + a \cdot \overline{b} \cdot \overline{c} + \overline{a} \cdot \overline{b} \cdot c + \overline{a} \cdot b \cdot \overline{c}$$

where $a$, $\overline{a}$ are the input signal possibilities to said first and second current switches $b$, $\overline{b}$ are the input signal possibilities to said fourth current switch and $c$, $\overline{c}$ are the input signal possibilities for said third current switch, wherein said collectors of said second transistors of said first and third current switches and of said first transistor of said second current switch are connected to said first gating point, and said collectors of said first transistors of said first and third current switches and said collector of said second transistor of said second current switch are connected to said second gating point.

3. A parity circuit as set forth in claim 1, for the formation of the logical function $$Q = \overline{P} = \overline{a} \cdot \overline{b} \cdot \overline{c} + a \cdot b \cdot \overline{c} + a \cdot \overline{b} \cdot c + \overline{a} \cdot b \cdot c$$

where $a$, $\overline{a}$ are the input signal possibilities to said first and second current switches, $b$, $\overline{b}$ are the input signal possibilities to said fourth current switch, and $c$ , $\overline{c}$ are the input signal possibilities to said third current switch, and wherein said collection of said second transistor of said first current switch and of said first transistors of said second and third current switches are connected to said first gating point, and said collectors of said second transistors of said second and third current switches and of said first transistor of said first current switch are connected to said second gating point.

4. A parity circuit as set forth in claim 1, wherein said means for deriving an output signal comprises a resistor, first and second transistors each having a base, an emitter and a collector, said bases individually connected to said first and second gating points, said collectors connected together and adapted for connection to the reference potential, and said emitters connected together and connected to and adapted for connection to another reference potential by way of said resistor, and an output terminal connected to the junction of said emitters and said resistor.

5. A parity circuit as set forth in claim 1, wherein said first current path includes a first transistor having a collector connected to said emitters of said first current switch, an emitter connected to said means for providing constant currents, and a base, and said second current path includes a second transistor having a collector connected to said emitters of said second current switch, an emitter connected to said means for providing constant currents, and a base connected to a reference potential, and further comprising a resistor-transistor network, including a base-emitter diode, connected to said base and adapted to receive the input signal of said fourth current switch for shifting the potential at said base by at least the voltage of said base-emitter diode in a conductive state.

6. A parity circuit as set forth in claim 5, wherein said means for providing constant currents comprises a resistor connected to said emitters of said third current switch and adapted for connection to another reference potential.

7. A parity circuit as set forth in claim 5, wherein said means for providing constant currents comprises a resistor, and a transistor having an emitter connected to and adapted for connection to another reference potential via said resistor, a base adapted for connection to another fixed potential and a collector connected to said emitters of said fourth current switch.

* * * * *